United States Patent
Otake (10) Patent No.: US 7,034,607 B2
(45) Date of Patent: Apr. 25, 2006

(54) SWITCHING CONSTANT-CURRENT POWER DEVICE

(75) Inventor: Tetsushi Otake, Tsurugashima (JP)

(73) Assignee: Toko Kabushiki Kaisha, (JP)

( * ) Notice: Subject to any disclaimer, the term of this patent is extended or adjusted under 35 U.S.C. 154(b) by 56 days.

(21) Appl. No.: 10/831,588

(22) Filed: Apr. 23, 2004

(65) Prior Publication Data

US 2004/0212420 A1 Oct. 28, 2004

(30) Foreign Application Priority Data

Apr. 28, 2003 (JP) ............................. 2003-123247
Apr. 28, 2003 (JP) ............................. 2003-123248

(51) Int. Cl.
G05F 1/565 (2006.01)
(52) U.S. Cl. ..................... 327/590; 327/544; 315/308
(58) Field of Classification Search ................. None
See application file for complete search history.

(56) References Cited

U.S. PATENT DOCUMENTS

| 4,987,348 | A | * | 1/1991 | Wong ......................... 315/307 |
| 6,198,198 | B1 | * | 3/2001 | Fujimura et al. ......... 310/316.01 |
| 6,509,700 | B1 | * | 1/2003 | Nakatsuka et al. .......... 315/291 |
| 6,909,249 | B1 | * | 6/2005 | Otake ......................... 315/291 |
| 2004/0183380 | A1 | * | 9/2004 | Otake ........................... 307/82 |
| 2005/0002134 | A1 | * | 1/2005 | Ohtake et al. ................. 361/18 |

FOREIGN PATENT DOCUMENTS

| JP | 11-068161 | 3/1999 |
| JP | 2001-215913 | 8/2001 |
| JP | 2002-203988 | 7/2002 |

* cited by examiner

Primary Examiner—Timothy P. Callahan
Assistant Examiner—Terry L. Englund
(74) Attorney, Agent, or Firm—Renner, Kenner, Greive, Bobak, Taylor & Weber (57) ABSTRACT

A switching constant-current power device can stabilize current flowing to a load (e.g. a display device comprising an LED, or the like) even when the current is repeatedly interrupted. A voltage current detector is connected to the output side of a power converter and creates a voltage signal in accordance with the output voltage thereof; and a feedback circuit is provided between a controller for driving the power converter and a current detector, which generates a first feedback signal in accordance with the load current. The feedback circuit comprises a signal holding unit, which outputs a second feedback signal that was created by consulting the voltage signal at a given time, the feedback circuit supplying the first feedback signal, output by the current detector, to the controller when load current is flowing, and supplying the second feedback signal, output by the signal holding unit, to the controller when load current is not flowing.

9 Claims, 5 Drawing Sheets

SWITCHING CONSTANT-CURRENT POWER DEVICE

BACKGROUND OF THE INVENTION

1. Field of the Invention

This invention relates to a switching constant-current power device for supplying stabilized current to a repeatedly interrupted load.

2. Description of the Prior Art

Conventionally, switching-system power devices are often used in supplying a stable voltage to a load. However, a switching-system power device having the circuit constitution shown in FIG. 1 can also be used in supplying an approximately constant current to a load, by supplying a feedback signal in correspondence with an output current to a control circuit.

Figure 1:
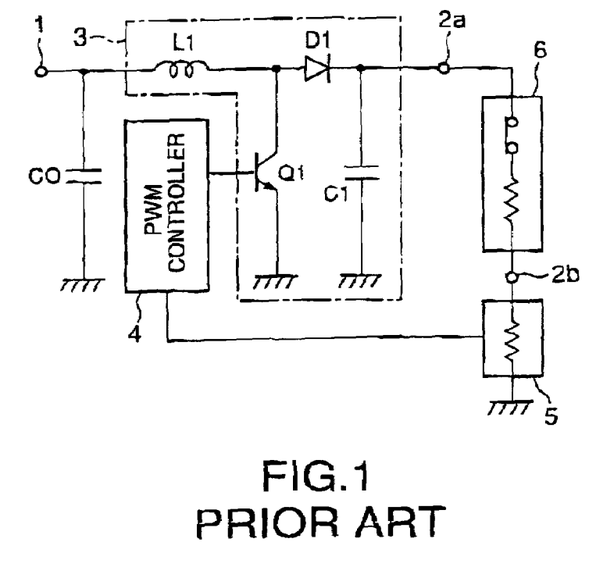
FIG. 1 is a block diagram showing one example of a conventional switching constant-current power device.

In FIG. 1, reference numeral 1 represents an input terminal, which electrical power is supplied to from an outside battery or the like, and reference numerals 2a and 2b represent output terminals for stably supplying a predetermined current to a load 6, provided between them. A power converter 3 is connected between the input terminal 1 and the output terminal 2a, and forms a boosting chopper converter comprising a choke coil L1, a switching transistor Q1, a rectifying diode D1, and a smoothing capacitor C1.

A current detector 5 is connected between the other output terminal 2b and ground, which functions as a reference potential point for the circuit; the current detector 5 detects current flowing to the load 6 (hereinafter "load current"), and generates a feedback signal in correspondence therewith. A controller 4 is connected between the power converter 3 and the current detector 5, receiving the feedback signal from the current detector 5 and driving the power converter 3 in accordance with the level of the feedback signal. (It is assumed here that the controller 4 comprises a conventional IC using a separately excited PWM control system.)

The power converter 3, the controller 4, and the current detector 5, together constitute a switching constant-current power device. The element CO connected between the input terminal 1 and ground is a capacitor for input filter.

The operation of the switching constant-current power device of FIG. 1 will be explained briefly. The switching transistor Q1 in the power converter 3 switches on and off in compliance with a signal supplied from the controller 4 (the on-off frequency being approximately several hundred kHz). In compliance with the on-off operation of the switching transistor Q1, current is fed from the choke coil L1 via the rectifying diode D1 to the smoothing capacitor C1. As a result, the smoothing capacitor C1 is charged to a higher voltage than the input voltage supplied to the input terminal 1, and a current corresponding to the voltage between the terminal of the smoothing capacitor C1 flows between the load 6 and the current detector 5. The current detector 5 creates a feedback signal in correspondence with the load current, and feeds it back to the controller 4.

The level of the feedback signal supplied from the current detector 5 to the controller 4 corresponds not to the output voltage, as in a normal switching power device, but to the output current (=load current). Therefore, in compliance with its own internal control logic, the controller 4 creates a high-frequency (several hundred kHz) on-duty pulse signal in correspondence with the feedback signal (=load current), and supplies this signal to the switching transistor Q1. The switching transistor Q1 switches on and off at an on-duty corresponding to the size of the load current. For example, when the load current is lower than the stabilizing target value, the voltage between the terminals of the smoothing capacitor C1 is boosted and induced so as to increase the load current. As a result of such operations, the load current of the device shown in FIG. 1 becomes stable.

Recently, however, display devices and lighting devices of various sizes and types are being fitted in electronic equipment, and many of these devices use a light-emitting diode (hereinafter "LED") as their light source. When using an LED as a light source, a stable current supply is required in order to ensure that the amount of light, brightness, and the like, are constant. Accordingly, in recent electronic equipment, a switching constant-current power device such as that shown in FIG. 1 is provided in accompaniment with the display devices and lighting devices, and supplies stabilized current to the LED, as disclosed in Patent Documents Nos. 1 to 3.

Patent Document No. 1: Japanese Laid-Open Patent Application No. 11-068161

Patent Document No. 2: Japanese Laid-Open Patent Application No. 2001-215913

Patent Document No. 3: Japanese Laid-Open Patent Application No. 2002-203988

In some recent display devices and lighting devices that use an LED as a light source, the LED is repeatedly switched on and off at a speed that cannot be perceived by the human eye (specifically, several hundred Hz or more) to reduce energy consumption and adjust the light. Display devices and light devices of this type naturally have periods where current is flowing to the LED (hereinafter "current pass period") and periods when it is not (hereinafter "current cut-off period"). When current is being supplied to the LED by a switching constant-current power device such as that shown in FIG. 1, the feedback signal supplied from the current detector 5 to the controller 4 is almost at zero level during the current cut-off period that is created by interrupting the load.

In response to this feedback signal, the controller 4 attempts to set the on-duty of the on-off operation of the switching transistor Q1 to its maximum during the current cut-off period, and attempts to set the on-duty in correspondence with the feedback signal in the next current pass period. When the on-duty is at its maximum during the current cut-off period, the voltage between the terminals of the smoothing capacitor C1 rises abruptly more than is necessary, and a load current exceeding the target value for stabilization flows for a comparatively long time during the next load current pass period, creating instability in the load current.

One method of countering this type of instability in the load current is, for example, to smooth the feedback signal by using a capacitor having a comparatively large capacity before supplying it to the controller 4. However, when a capacitor having a capacity large enough to keep the feedback signal at a significant size during the current cut-off period is provided, the feedback signal processed by the controller 4 holds the average value for a comparatively long time. Consequently, non-cyclical load interruption, or fluctuation in the load caused by factors other than interruption, makes it impossible to speedily return to the stabilization target value a load current that has deviated from that target value, and may result in load current instability caused by factors other than the current cut-off period.

Thus, with an interrupted load, the response speed of the control operation of the feedback loop running from the controller 4 via the switching transistor Q1, the smoothing capacitor C1, the load 6, and the current detector 5, to the controller 4, may become incapable of keeping up with changes in the load, making it impossible to stabilize the load current.

SUMMARY OF THE INVENTION

Accordingly, it is an object of this invention to provide a switching constant-current power device that is capable of stabilizing load current even when the load is repeatedly interrupted.

In order to achieve the above object, this invention provides a switching constant-current power device comprising a switching-system power converter, which supplies a predetermined current to a load; a current detector, which generates a first feedback signal in accordance with a load current; a controller, which drives the power converter so as to stabilize the load current in accordance with the first feedback signal; a voltage current detector, which creates a voltage signal in accordance with an output voltage of the power converter; and a feedback circuit having a signal holder, provided between the current detector and the controller and outputting a second feedback signal that was created after consulting the voltage signal. The feedback circuit supplies either the first feedback signal or the second feedback signal to the controller in accordance with the load status.

Furthermore, this invention provides a switching constant-current power device comprising a switching-system power converter, which supplies a predetermined current to a load; a current current detector, which generates a first feedback signal in accordance with a load current; a reference voltage source, which obtains a reference voltage; a controller, which drives the power converter so as to stabilize the load current in accordance with the first feedback signal and the reference voltage; and a feedback circuit, which is provided between the current detector and the controller and has a fixed signal generator for creating a second feedback signal having a constant signal level. The feedback circuit supplies either the first feedback signal or the second feedback signal to the controller in accordance with a load status.

In a first aspect of the first Claim, the switching constant-current power device of this invention comprises a power converter for supplying stabilized current to a load, a controller for driving the power converter, and a current detector for generating a first feedback signal in accordance with the load current; a feedback circuit is provided between the current detector and the controller, and a voltage current detector for generating a voltage signal in accordance with the output voltage of the power converter is connected to the output side of the power converter. The feedback circuit has a signal holder that outputs a second feedback signal, the feedback circuit supplying the first feedback signal, output by the current current detector, to the controller when the load current is flowing, and supplying the second feedback signal, output by the signal holder, to the controller when the load current is not flowing.

The second feedback signal is created by consulting the voltage signal of the voltage current detector, and its signal level in a maintained state is set at a larger value than the first feedback signal when a specific load current is flowing to the load.

In a second aspect of the tenth Claim, a feedback circuit is provided between the current detector, which generates a first feedback signal in accordance with the load current, and the controller, which drives a power converter for supplying current to the load, the feedback circuit comprising a fixed signal generator for creating a second feedback signal having a constant signal level. The feedback circuit supplies the first feedback signal, output by the current current detector, to the controller when the load current is flowing, and supplies the second feedback signal, output by the signal holder, to the controller when the load current is not flowing.

The signal level (voltage) of the second feedback signal created by the fixed signal generator is approximately the same as, or greater than, a reference voltage that is output from a reference voltage source inside the controller.

In the switching constant-current power device incorporating a feedback circuit such as that described above, the feedback circuit supplies the first feedback signal to the controller when load current is flowing, stabilizing the load current in the same manner as a conventional circuit.

On the other hand, when load current is not flowing, in the switching constant-current power device incorporating a feedback circuit such as that described above, the feedback circuit supplies the second feedback signal to the controller, thereby stopping the operation of the power converter (=the on-off operation of its switching transistor). As a result, even when the load is interrupted, there are no problems of an unnecessary increase in the voltage between the terminals of the smoothing capacitor, or the current control operation of the switching constant-current power device becoming unable to keep up with changes in the load due to the limited response speed of the feedback loop, or an inability to stabilize the load.

DESCRIPTION OF THE PREFERRED EMBODIMENTS

Figure 2:
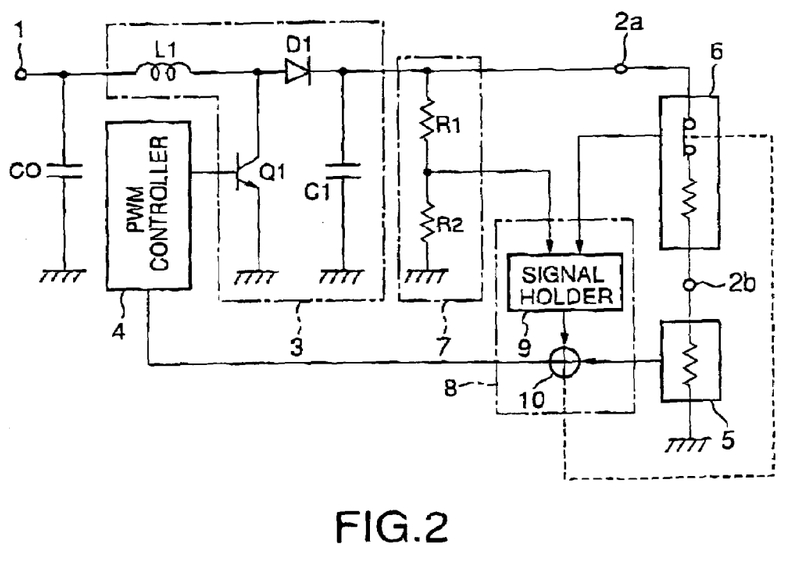
FIG. 2 is a block diagram showing the basic constitution of a first aspect of the switching constant-current power device according to this invention.

FIG. 2 shows the basic constitution of a first aspect of the switching constant-current power device according to this invention.

The switching constant-current power device shown in FIG. 2 is substantially the same as the conventional circuit shown in FIG. 1, with the exceptions of having a voltage current detector 7, comprising a series-circuit of resistors R1 and R2 between the output terminal 2a and ground, and a feedback circuit 8 between the controller 4 and the current detector 5. The feedback circuit 8 of FIG. 2 broadly divides into a signal holding unit 9 for outputting a second feedback signal, and a selecting unit 10 for supplying either the first feedback signal output from the current detector 5 or the second feedback signal to the controller 4. Here, the selecting unit 10 is switched in accordance with the status of the load (in other words, the on-off of the LED).

In the switching constant-current power device comprising the feedback circuit 8 described above, when load current is flowing, the selecting unit 10 in the feedback circuit 8 selectively supplies the first feedback signal, output from the current detector 5, to the controller 4. In this state, the power device of FIG. 2 stabilizes the load current by exactly the same operation as the conventional circuit shown in FIG. 1.

While the load current is flowing, the signal holding unit 9 inside the feedback circuit 8 consults the voltage signal output from the voltage current detector 7, and executes a predetermined operation for generating the second feedback signal.

On the other hand, when the load current is not flowing, the selecting unit 10 selectively supplies the second feedback signal, output from the signal holding unit 9, to the controller 4.

The controller 4 receives the second feedback signal, which has a greater signal level than the first feedback signal, and stops the on-off operation of the switching transistor Q1 (=the operation of the power converter 3).

When the operation of the switching transistor Q1 stops, there is no longer any possibility that the voltage between the terminals of the smoothing capacitor C1 will not be boosted during the current cut-off period, or that a load current exceeding the stabilization target value will flow during the next current pass period. As a result, the load current can be stabilized even when the load is repeatedly interrupted.

Figure 3:
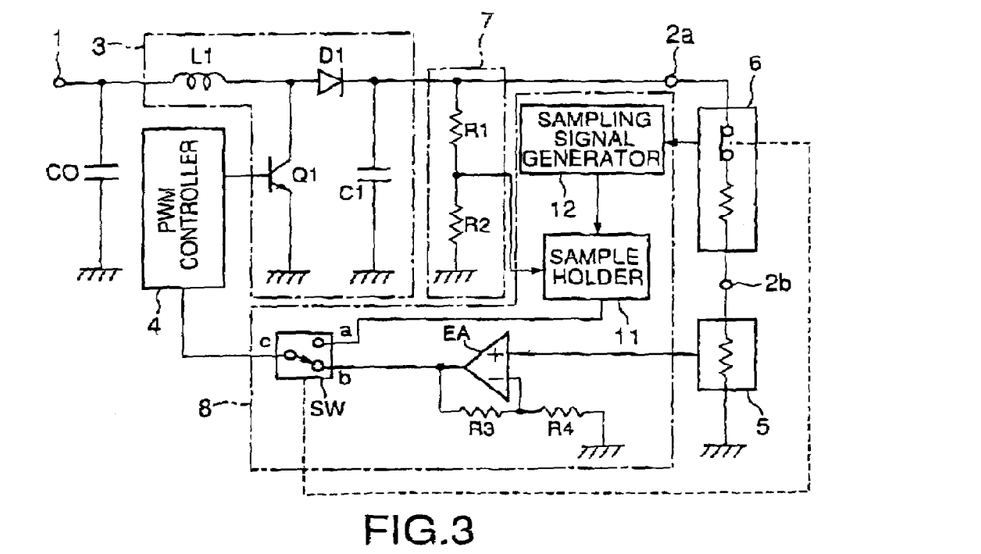
FIG. 3 is a block diagram showing a first embodiment of the first aspect of the switching constant-current power device according to this invention.

FIG. 3 shows a first embodiment of the first aspect of the switching constant-current power device according to this invention The circuit of FIG. 3 has approximately the same basic constitution as that of the circuit shown in FIG. 2, but the feedback circuit 8, being a primary part of this invention, is configured as described below.

A sample holder 11 and a sampling signal generator 12 are wired so that a sampling signal is supplied from the sampling signal generator 12 to the sample holder 11. The wiring is arranged so that a voltage signal is supplied from the voltage current detector 7 to the sample holder 11, and a signal corresponding to the status of the load 6 is supplied from the sampling signal generator 12. The output terminal of the sample holder 11 is connected to one connection terminal a of a switch SW, which is switched in accordance with the status of the load 6.

A communal terminal c of the switch SW connects to the controller 4, and another connection terminal b connects to an output terminal of an error amplifier EA. One input terminal of the error amplifier EA connects to the current detector 5, and another input terminal thereof connects to a communal connection point of resistors R3 and R4, which are connected in series between the output terminal of the error amplifier EA and ground.

The sample holder 11 and the sampling signal generator 12 correspond to the signal holding unit 9 in FIG. 2, and the switch SW corresponds to the selecting unit 10 in FIG. 2.

The circuit section comprising the error amplifier EA and the resistors R3 and R4 is a simple amplifier circuit for increasing the signal level of the first feedback signal to one that can be processed by the controller 4.

In the feedback circuit 8 shown in FIG. 3, when the load current is flowing, the switch SW that switches in accordance with the status of the load 6 is switches to the connection terminal b side. Consequently, the feedback circuit 8 selectively outputs the first feedback signal, which was amplified by the error amplifier EA after being output from the current detector 5, to the controller 4.

When the sampling signal generator 12 detects from its input signal that load current is flowing, it outputs a pulse-shaped sampling signal to the sample holder 11 at a predetermined timing. Upon receiving the sampling signal, the sample holder 11 resets its previous signal output, consults the voltage signal that is being output from the voltage current detector 7 at that moment, and newly generates a second feedback signal having a signal level corresponding to that of the voltage signal. The second feedback signal keeps this signal level until the next sampling signal is supplied.

When the load 6 switches so that no load current is flowing, the switch SW is switched to the connection terminal a side. As a consequence, the feedback circuit 8 selectively supplies the second feedback signal, output from the sample holder 11, to the controller 4.

The second feedback signal is set to a greater signal level than the first feedback signal, and therefore, after receiving this second feedback signal, the controller 4 stops the on-off operation of the switching transistor Q1.

As a result of this operation of the feedback circuit 8, the power device of FIG. 3 is able to stabilize the load current even when the load is repeatedly interrupted, in the same way as the power device of FIG. 2.

Figure 4:
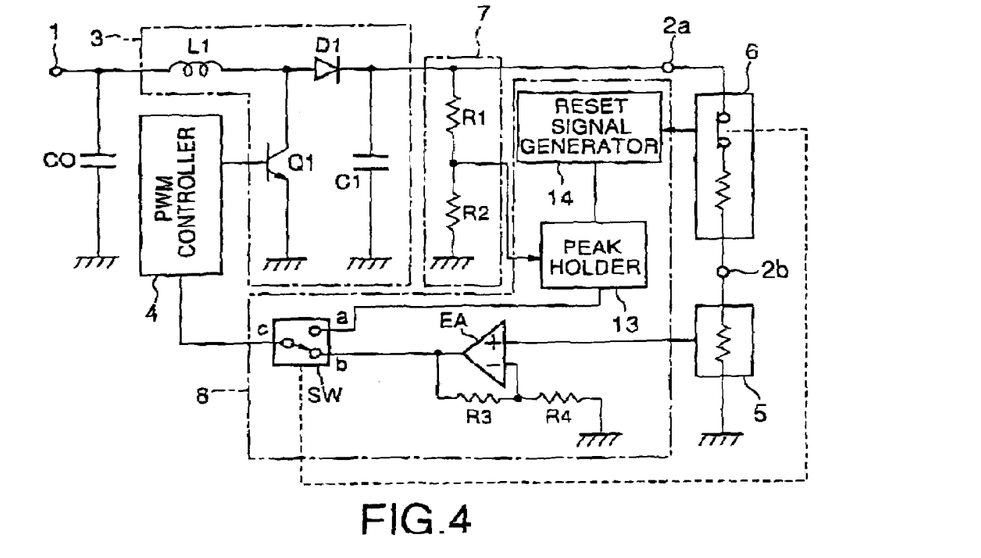
FIG. 4 is a block diagram showing a second embodiment of the first aspect of the switching constant-current power device according to this invention.

FIG. 4 shows a second embodiment of the first aspect of the switching constant-current power device according to this invention.

In the circuit of FIG. 4, the feedback circuit 8 has a peak holder 13 instead of the sample holder 11 of FIG. 3, and has a reset signal generator 14 instead of the sampling signal generator 12. Consequently, the operation of the feedback circuit 8 shown in FIG. 4 is slightly different from that of the feedback circuit 8 shown in FIG. 3.

When the reset signal generator 14 detects from the input signal that the load current is not flowing, it outputs a pulse-like reset signal to the peak holder 13 at a predetermined timing. Upon receiving this reset signal, the peak holder 13 resets its signal output up to that point. However, as soon as the pulse of the reset signal stops, the peak holder. 13 consults the voltage signal from the voltage current detector 7 and generates a second feedback signal having a signal level that corresponds to the voltage signal. Then, the signal level of the second feedback signal is updated to one corresponding to the maximum value of the new voltage signal that was created after resetting, and this signal level is maintained until the next reset signal is supplied.

When the load 6 switches so that no load current is flowing, the switch SW is switched to the connection terminal a side. As a consequence, the feedback circuit 8 selectively supplies the second feedback signal, output from the peak holder 13, to the controller 4. The second feedback signal is set to a greater signal level than the first feedback signal, and therefore, after receiving this second feedback signal, the controller 4 stops the on-off operation of the switching transistor Q1. The end result of this is that the power device in FIG. 4 performs the same operation as that of the power device in FIG. 3, enabling it to stabilize the load current even when the load is repeatedly interrupted.

In the circuit of FIG. 4, the second feedback signal may be set to approximately the same signal level as the first feedback signal. When a second feedback signal having approximately the same signal level as the first feedback signal is supplied to the controller 4, the controller 4 continues the on-off operation of the switching transistor Q1 immediately after entering the current cut-off period. However, as the voltage between the terminals of the smoothing capacitor C1 increases, so does the size of the second feedback signal output from the peak holder 13. Therefore, when the second feedback signal exceeds a predetermined size, the controller 4 stops the on-off operation of the switching transistor Q1, preventing any further increase in the voltage between the terminals of the smoothing capacitor C1.

Thus, in the circuit shown in FIG. 4, the signal level of the second feedback signal need not necessarily be greater than that of the first feedback signal.

Figure 5:
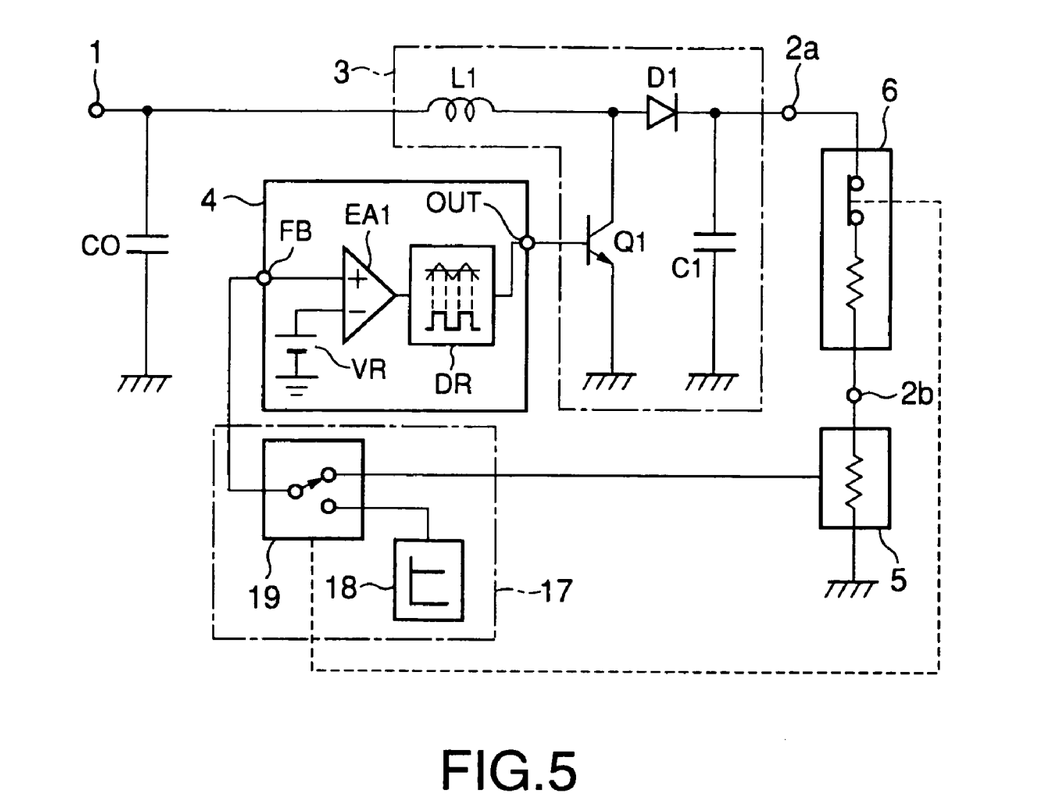
FIG. 5 is a block diagram showing a second aspect of the switching constant-current power device according to this invention.

Subsequently, FIG. 5 shows a second aspect of the switching constant-current power device according to this invention.

The switching constant-current power device shown in FIG. 5 is the same as the conventional circuit shown in FIG. 1 with the exception of its having a feedback circuit 17, connected between the controller 4 and the current detector 5. The feedback circuit 17 of FIG. 5 broadly divides into a fixed signal generator 18 for creating the second feedback signal, and a selecting unit 19 for supplying either the first feedback signal output from the current detector 5, or the second feedback signal, to the controller 4. Here, the selecting unit 19 is switched in accordance with the status of the load (in other words, the on/off of the LED).

Figure 6:
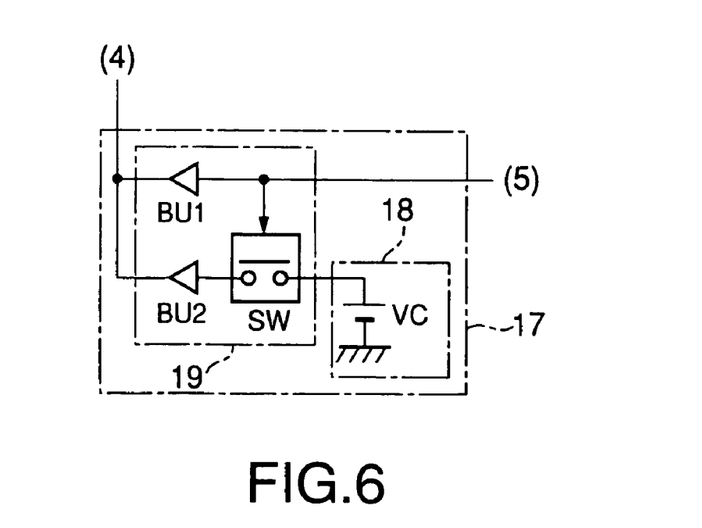
FIG. 6 is a block diagram showing a feedback circuit forming a primary part of the second aspect of this invention.

FIG. 6 is a block diagram showing one example of the constitution of the feedback circuit 17.

In FIG. 6, the fixed signal generator 18 comprises a voltage source VC, which outputs a voltage that is almost constant. The selecting unit 19 comprises a first buffer BU1, provided between the current detector 5 and the controller 4, and a second buffer BU2 and a switch SW, which are provided in series between the fixed signal generator 18 and the controller 4.

In the feedback circuit 17 configured in this way, for example, when load current flows to the load 6 and the level of the first feedback signal output from the current detector 5 is high, the switch SW of the selecting unit 19 is off, and the first feedback signal is supplied from the first buffer BU1 to the controller 4. On the other hand, when load current does not flow to the load 6 and the level of the first feedback signal from the current detector 5 is almost zero, the switch SW switches on and the second feedback signal, created by the fixed signal generator 18, is supplied from the second buffer BU2 to the controller 4.

In the switching constant-current power device comprising the feedback circuit 17 shown in FIG. 5, when load current is flowing, the first feedback signal from the current detector 5 is selectively supplied to the controller 4. In this state, the device having the constitution shown in FIG. 5 can stabilize the load current by exactly the same operation as a conventional circuit.

On the other hand, when no load current is flowing, the second feedback signal from the fixed signal generator 18 is selectively supplied to the controller 4. The controller 4 receives the second feedback signal, and fixes the on-duty for the on-off operation of the switching transistor Q1 at a predetermined size.

Fixing the on-duty of the switching transistor Q1 prevents the voltage between the terminals of the smoothing capacitor C1 from rising during the current cut-off period. This makes it less likely that a load current exceeding than the stabilization target value will flow during the next current pass period. By setting the on-duty of the switching transistor Q1 during the current cut-off period to almost the same as that when current at the stabilization target value is actually being supplied to the load 6, when the load current has changed from a non-flowing state to a state of flow, a feedback loop control operation is effected rapidly in correspondence with the first feedback signal.

As a result of this operation, the load current can be stabilized even when the load is repeatedly interrupted.

Figure 7:
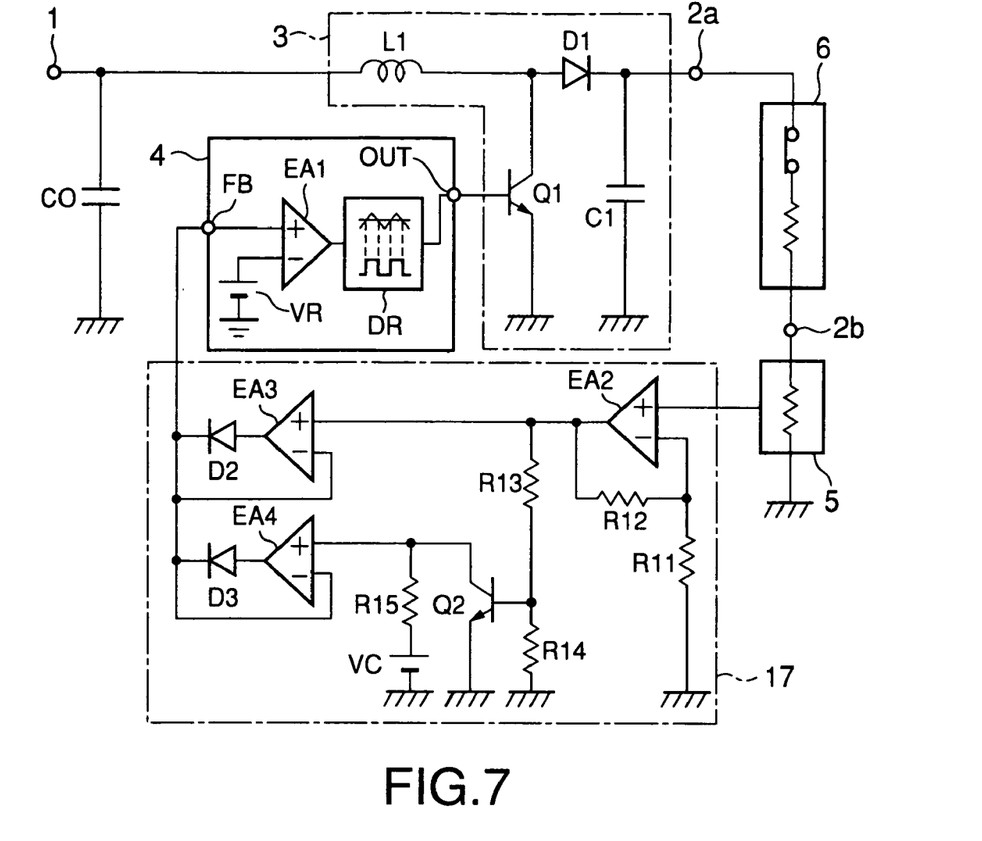
FIG. 7 is a specific circuit diagram of the second aspect of the switching constant-current power device according to this invention.

FIG. 7 shows a specific example of a circuit of the switching constant-current power device according to the second aspect of this invention. In the circuit of FIG. 7, the feedback circuit 17 forming a primary part of this invention has the following constitution.

A non-inverting side input terminal (+) of an error amplifier EA2 connects to the current detector 5, and an inverting side input terminal (−) of the error amplifier EA2 connects via a resistor R11 to ground. A resistor R12 is connected between an output terminal and the inverting side input terminal (−) of the error amplifier EA2, and the output terminal of the error amplifier EA2 is further connected to a non-inverting side input terminal (+) of an error amplifier EA3. An output terminal of the error amplifier EA3 connects via a diode D2 for preventing counterflow to a terminal pin FB for feedback signal input of the controller 4, and a non-inverting side input terminal (−) of the error amplifier EA3 connects to a connection point between the diode D2 and the terminal pin FB.

Resistors R13 and R14 are connected in series between the output terminal of the error amplifier EA3 and ground, a connection point between the resistors R13 and R14 connecting to the base of a switching transistor Q2. The emitter of the switching transistor Q2 connects to ground; a resistor R15 and a voltage source VC are connected between the collector of the switching transistor Q2 and ground.

The collector of the switching transistor Q2 connects to a non-inverting side input terminal (+) of another error amplifier EA4, the output terminal of the error amplifier EA4 connects via a diode D3 to the terminal pin FB of the controller 4, and the inverting side input terminal (−) connects to a connection point between the diode D3 and the terminal pin FB.

In the switching constant-current power device shown in FIG. 7, the circuit section comprising the diode D2 and the error amplifier EA3 forming the feedback circuit 17 actually corresponds to the first buffer BU1 of FIG. 6, and the circuit section comprising the diode D3 and the error amplifier EA4 actually corresponds to the second buffer BU2 of FIG. 6. The circuit section comprising the resistors R13, R14, R15, and the switching transistor Q2, functionally corresponds to the switch SW of FIG. 6.

The circuit section that comprises the error amplifier EA2, and the resistors R11 and R12, amplifies and adjusts the first feedback signal, supplied from the current detector 5, to a level at which it can be processed by the internal control logic of the controller 4; in the circuit shown in FIG. 7, this section is incorporated in the feedback circuit 17, but it may be incorporated in the current detector 5 according to circumstances.

In the circuit configured as shown in FIG. 7, when load current is flowing, the level of the first feedback signal output by the current detector 5 at first matches the load current. The first feedback signal is amplified by the error amplifier EA2, and supplied to the error amplifier EA3 and the switching transistor Q2.

At this point, the transistor Q2 switches on, and the non-inverting side input terminal (+) of the error amplifier EA4 drops to ground. Consequently, the output of the error amplifier EA4 becomes zero, and the first feedback signal output by the error amplifier EA3 is selectively supplied to the terminal pin FB of the controller 4. As a result, the controller 4 drives the switching transistor Q1 at an on-duty that matches the load current, ensuring that the load current is set to the stabilization target value.

Subsequently, when the load current is no longer flowing, the level of the first feedback signal from the current detector 5 decreases to almost zero, and the signal level supplied via the error amplifier EA2 to the error amplifier EA3 and the switching transistor Q2 is also almost zero.

At this time, the transistor Q2 switches off, and a second feedback signal is supplied from the voltage source VC to the non-inverting side input terminal (+) of the error amplifier EA4. Since the error amplifier EA3 is outputting at zero level, the second feedback signal from the error amplifier EA4 is selectively supplied to the terminal pin FB of the controller 4. As a result, the controller 4 drives the switching transistor Q1 at an on-duty that has been fixed to a predetermined size.

In the circuit of FIGS. 6 and 7 described above, for example, when the output voltage of the voltage source VC (i.e. the signal level of the second feedback signal) is set to approximately the same size as a reference voltage output from a reference voltage source VR inside the controller 4, the controller 4 drives the switching transistor Q1 at a predetermined on-duty during the current cut-off period. The on-duty of the switching transistor Q1 at this time is fixed at approximately the same on-duty as when current at the stabilization target value is flowing to the load 6, preventing voltage between the terminals of the smoothing capacitor C1 from increasing during the current cut-off period.

On the other hand, when the output voltage of the voltage source VC is set larger than the reference voltage, e.g. at approximately twice the reference voltage, the controller 4 turns the switching transistor Q1 fully off during the current cut-off period. That is, the controller 4 sets the on-duty of the on-off operation of the switching transistor Q1 to zero. When the switching transistor Q1 remains off, the power converter 3 actually ceases operating; this completely prevents any increase in the voltage between the terminals of the smoothing capacitor C1.

For example, when the load 6 has a large number of LEDs and a short current cut-off period, the voltage output from the voltage source VC is set to approximately the same size as the reference voltage. In the case of such a short current cut-off period, there is only a small increase in the voltage between the terminals of the smoothing capacitor C1. Moreover, when switching to a state where load current flows to the load 6, excess electric charge that has accumulated in the smoothing capacitor C1 during the current cut-off period can be used to rapidly restore the electric charge of the LED light-emitting layer, which was destroyed during the current cut-off period. This prevents a large load current from flowing when the load current changes from a state of non-flow to a state of flow, while at the same time making it possible to activate the operation of rapidly controlling the feedback loop in correspondence with the first feedback signal.

Conversely, when the load 6 has only a few LEDs and a long current cut-off period, the voltage output from the voltage source VC is set at a larger value than the reference voltage. In other words, during a long current cut-off period, the voltage between the terminals of the smoothing capacitor C1 is more likely to become excessively large. However, keeping the switching transistor Q1 in the off state will completely prevent any increase in the terminal between the terminals of the smoothing capacitor C1 during the current cut-off period, and therefore, the load current will not be large when switched from a state of non-flow to flow.

As described above, the output voltage of the voltage source VC should be selected and set in accordance with conditions such as the number of LEDs of the load 6, the length of the current cut-off period, and the like.

Figure 8:
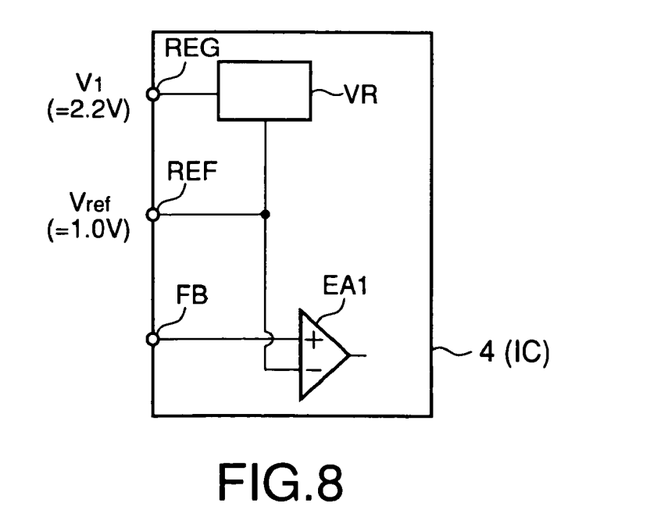
FIG. 8 is a block diagram showing one example of the internal structure of an IC for controlling a DC-DC converter in the second aspect.

Some commercially marketed ICs for controlling DC-DC converters are configured so that a stable voltage created inside the IC can be led outside. FIG. 8 shows a schematic internal constitution of one example of such an IC, in which an internal reference voltage source VR creates a reference voltage $V_{ref}$ of 0.1 V and a stabilizing voltage $V_1$ of 2.2 V. The reference voltage $V_{ref}$ can supplied to one input terminal of the error amplifier EA1, which inputs the first or second feedback signal to its other input terminal, while simultaneously being led outside the IC from a terminal REF. The stabilizing voltage $V_1$ can be led outside the IC from a terminal REG.

Figure 9A:
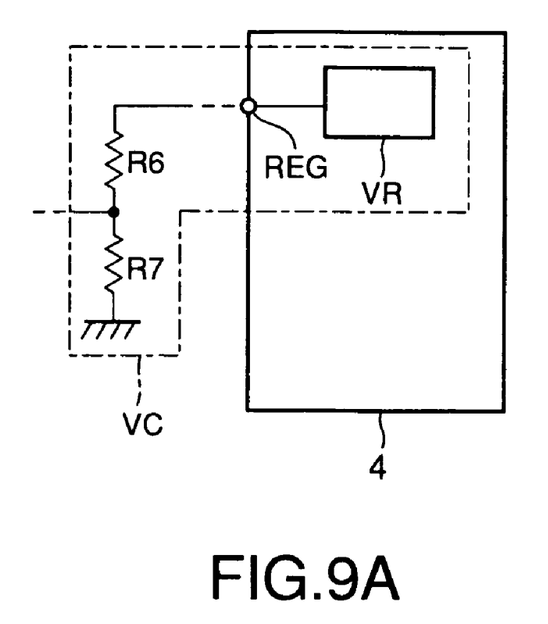
FIGS. 9A and 9B are examples of the constitution of a voltage source VC for creating a second feedback signal in the second aspect.
Figure 9B:
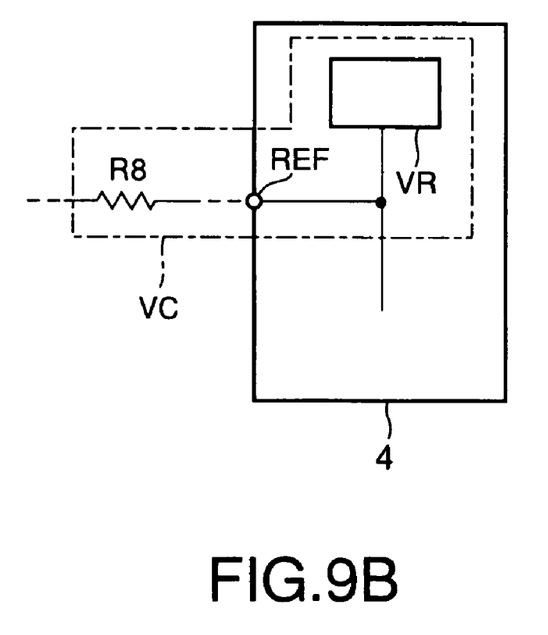

FIGS. 9A and 9B show voltage sources VC that can be obtained by using the IC for control shown in FIG. 8 as the controller 4. For example, when the signal level of the second feedback signal (=the output voltage of the voltage source VC) is to be set at a larger value than the reference voltage, the constitution should be that shown in FIG. 9A; when the signal level of the second feedback signal is to be set at approximately the same size as the reference voltage, the constitution should be that shown in FIG. 9B. Of course, in the circuit shown in FIG. 9A, the signal level of the second feedback signal may be set at approximately the same size as the reference voltage by adjusting the resistances of the resistors R6 and R7.

FA7703 (manufactured by Fuji Electric Corporation) is one example of an IC for control that enables voltage stabilized within the IC to be led outside the IC.

In the above explanations of embodiments of the switching constant-current power device according to this invention, it is assumed that the power converter 3 comprises a boosting chopper converter and the controller 4 comprises an IC for control using a separately excited PWM, but the switching constant-current power device of this invention is not limited to these constitutions. Similarly, the current detector 5 may use a detection method other than resistance detection, and the specific circuit constitution may of course be modified in various ways without deviating from the primary principles of this invention.

The load 6 does not necessarily have to be a display device or a lighting device comprising LEDs, and need only be one which is repeatedly interrupted while in use.

What is claimed is:

1. A switching constant-current power device comprising:
   a switching-system power converter, which supplies a predetermined current to a load;
   a current detector, which generates a first feedback signal in accordance with a load current;
   a controller, which drives the power converter so as to stabilize the load current in accordance with the first feedback signal;
   a voltage detector, which creates a voltage signal in accordance with an output voltage of the power converter; and a feedback circuit, provided between the current detector and the controller having a signal holder outputting a second feedback signal that was created after consulting the voltage signal, the signal holder creating the second feedback signal that is larger than the first feedback signal, created by consulting the voltage signal at a given time when a specified load current is flowing to the load. and maintaining the signal level of the second feedback signal for a given period of time, the feedback circuit supplying the first feedback signal to the controller when the load current is flowing, and supplying the second feedback signal to the controller when the load current is not flowing, wherein the feedback circuit supplies either the first feedback signal or the second feedback signal to the controller in accordance with a load status.

2. The switching constant-current power device as described in claim 1, the load comprising a light-emitting diode element that flashes repeatedly at high speed.

3. The switching constant-current power device as described in claim 1, the controller actually stopping the operation of the power converter during the period when the second feedback signal is being supplied at its maintained signal level.

4. The switching constant-current power device as described in claim 1, the signal holder comprising a sample holding circuit and a sampling signal generator.

5. The switching constant-current power device as described in claim 1, the signal holder comprising a peak holder and a reset signal generator.

6. A switching constant-current power device comprising:
a switching-system power converter, which supplies a predetermined current to a load;
a current detector, which generates a first feedback signal in accordance with a load current;
a reference voltage source, which obtains a reference voltage;
a controller, which drives the power converter so as to stabilize the load current in accordance with the first feedback signal and the reference voltage; and
a feedback circuit, which is provided between the current detector and the controller and has a fixed signal generator for creating a second feedback signal having a constant signal level, the feedback circuit supplying the first feedback signal to the controller when the load current is flowing, and supplying the second feedback signal to the controller when the load current is not flowing, wherein the feedback circuit supplies either the first feedback signal or the second feedback signal to the controller in accordance with a load status.

7. The switching constant-current power device as described in claim 6, the signal level of the second feedback signal that was created by the fixed signal generator being approximately equal to the reference voltage.

8. The switching constant-current power device as described in claim 6, the signal level of the second feedback signal that was created by the fixed signal generator being greater than the reference voltage, and the controller stopping the operation of the power converter when the second feedback signal is supplied to the controller.

9. The switching constant-current power device as described in claim 6 the load comprising a light-emitting diode element that flashes repeatedly at high speed.

* * * * *